(12) United States Patent
Himmelmann et al.

(10) Patent No.: US 11,536,154 B2
(45) Date of Patent: Dec. 27, 2022

(54) SYSTEMS AND METHODS FOR PROVIDING POWER AND FIRE SUPPRESSION USING A TURBO PUMP, COMPRESSED GAS, AND AN OBIGGS

(71) Applicant: KIDDE TECHNOLOGIES, INC., Wilson, NC (US)

(72) Inventors: Richard A. Himmelmann, Beloit, WI (US); Adam Chattaway, Old Windsor (GB); Harlan Hagge, Knightdale, NC (US); Kevin P. Aceves, Weatogue, CT (US)

(73) Assignee: Kidde Technologies, Inc., Wilson, NC (US)

( * ) Notice: Subject to any disclaimer, the term of this patent is extended or adjusted under 35 U.S.C. 154(b) by 442 days.

(21) Appl. No.: 15/950,892

(22) Filed: Apr. 11, 2018

(65) Prior Publication Data
US 2019/0316482 A1    Oct. 17, 2019

(51) Int. Cl.
*F01D 15/10*    (2006.01)
*A62C 3/08*    (2006.01)
(Continued)

(52) U.S. Cl.
CPC .............. *F01D 15/10* (2013.01); *A62C 3/08* (2013.01); *A62C 99/009* (2013.01);
(Continued)

(58) Field of Classification Search
CPC ..... A62C 99/0018; A62C 99/009; A62C 3/08; A62C 3/07; A62C 3/16; F01D 15/10; B64D 37/32
See application file for complete search history.

(56) References Cited

U.S. PATENT DOCUMENTS

| | | | |
|---|---|---|---|
| 4,827,716 A | * | 5/1989 | Vershure, Jr. ............. F02C 3/30 60/785 |
| 6,095,251 A | | 8/2000 | Mitchell et al. |

(Continued)

FOREIGN PATENT DOCUMENTS

| | | |
|---|---|---|
| EP | 2 623 159 | 8/2013 |
| EP | 2624353 | 8/2013 |

(Continued)

OTHER PUBLICATIONS

European Patent Office, European Search Report dated Sep. 9, 2019 in Application No. 19167817.6.

*Primary Examiner* — Christopher R Dandridge
(74) *Attorney, Agent, or Firm* — Snell & Wilmer L.L.P.

(57) ABSTRACT

A system includes a turbo pump to convert compressed gas into power, a storage tank to store the compressed gas, and a fire suppression control valve having a closed position in which the compressed gas is prevented from flowing to the cargo compartment and an open position in which the compressed gas is ported to the cargo compartment to suppress a fire. The system also includes a pump control valve having a closed position in which the compressed gas is prevented from flowing to the turbo pump and an open position in which the compressed gas is ported to the turbo pump to cause the turbo pump to convert the compressed gas into the power. The system also includes an OBIGGS to convert bleed air from a gas turbine engine into an inert gas to provide low rate discharge (LRD) fire suppression to the cargo compartment.

14 Claims, 5 Drawing Sheets

(51) Int. Cl.
  *B64D 41/00* (2006.01)
  *A62C 99/00* (2010.01)
  *B64D 37/32* (2006.01)

(52) U.S. Cl.
  CPC .......... *A62C 99/0018* (2013.01); *B64D 37/32* (2013.01); *B64D 41/00* (2013.01); *F05D 2220/62* (2013.01)

(56) References Cited

U.S. PATENT DOCUMENTS

| | | | |
|---|---|---|---|
| 6,601,653 B2 | 8/2003 | Grabow et al. | |
| 6,935,433 B2 | 8/2005 | Gupta | |
| 6,997,970 B2 * | 2/2006 | Crome | A62B 7/14 95/130 |
| 8,733,463 B2 | 5/2014 | Meier | |
| 8,814,130 B2 * | 8/2014 | Lelic | F16K 1/305 251/25 |
| 8,925,642 B2 | 1/2015 | Meier et al. | |
| 8,925,865 B2 * | 1/2015 | Stolte | B64D 25/00 244/129.2 |
| 9,033,061 B2 | 5/2015 | Chattaway et al. | |
| 9,072,921 B2 | 7/2015 | Ribarov et al. | |
| 9,694,221 B2 | 7/2017 | Hagge | |
| 9,814,917 B2 | 11/2017 | Gatsonides et al. | |
| 2004/0065778 A1 | 4/2004 | Jones | |
| 2010/0236796 A1 * | 9/2010 | Chattaway | A62C 99/0018 169/46 |
| 2016/0096051 A1 * | 4/2016 | Baker | A62C 3/08 169/46 |

FOREIGN PATENT DOCUMENTS

| | | | | |
|---|---|---|---|---|
| GB | WO2012076373 | * | 6/2012 | ............. B64D 37/32 |
| WO | 2012076373 | | 6/2012 | |

* cited by examiner

SYSTEMS AND METHODS FOR PROVIDING POWER AND FIRE SUPPRESSION USING A TURBO PUMP, COMPRESSED GAS, AND AN OBIGGS

FIELD

The present disclosure is directed to systems and methods for providing supplemental power and fire suppression to an aircraft.

BACKGROUND

Conventional aircraft may include a ram air turbine (RAT) that may deploy to provide supplemental power in case the aircraft loses electrical or hydraulic power. RATs may be relatively large and may have a relatively great mass, thus undesirably weighing the aircraft down and utilizing volume within the aircraft that may be used for other purposes.

Conventional aircraft may further include halon fire suppression systems. In response to a fire occurring in a cargo compartment of the aircraft, halon, which is a chemically active fire suppression agent stored as a liquefied compressed gas (halon may refer to Haloalkane, or halogenoalkane, a group of compounds consisting of alkanes with linked halogens) may be directed into the cargo compartment to suppress the fire. Halon may be harmful to the atmosphere and thus may be undesirable for use.

SUMMARY

Described herein is system for providing supplemental power and fire suppression on an aircraft having a gas turbine engine. The system includes a turbo pump configured to convert a compressed gas into at least one of electrical power, hydraulic power, or pneumatic power. The system also includes a storage tank configured to store the compressed gas. The system also includes a fire suppression control valve configured to be coupled between the storage tank and a cargo compartment of the aircraft and having a suppression closed position in which the compressed gas is prevented from flowing to the cargo compartment and a suppression open position in which the compressed gas is ported through the fire suppression control valve to the cargo compartment to suppress a fire. The system also includes a pump control valve configured to be coupled between the turbo pump and the storage tank and having a pump closed position in which the compressed gas is prevented from flowing to the turbo pump and a pump open position in which the compressed gas is ported through the pump control valve to the turbo pump to cause the turbo pump to convert the compressed gas into the at least one of the electrical power, the hydraulic power, or the pneumatic power. The system also includes an On Board Inert Gas Generating System (OBIGGS) configured to receive additional pneumatic, hydraulic, or electric power from the gas turbine engine and to generate an inert gas to provide low rate discharge (LRD) fire suppression to the cargo compartment.

Any of the foregoing embodiments may also include a controller coupled to the fire suppression control valve and the OBIGGS and configured to control the fire suppression control valve to change from the suppression closed position to the suppression open position in response to determining that the fire exists in the cargo compartment to provide an initial fire knockdown, and to control the OBIGGS to generate the inert gas to provide the LRD fire suppression to the cargo compartment.

In any of the foregoing embodiments, the controller is further configured to control the pump control valve to be in the pump open position in response to determining that the aircraft lacks power.

In any of the foregoing embodiments, the fire suppression control valve further has a suppression partially open position in which the compressed gas may flow to the cargo compartment at a slower rate than in the suppression open position, wherein the controller is further configured to control the fire suppression control valve to change from the suppression open position to the suppression partially open position after a predetermined amount of time from controlling the fire suppression control valve from the suppression closed position to the suppression open position to provide additional LRD fire suppression.

Any of the foregoing embodiments may also include a turbine exhaust selector valve located between the turbo pump and the cargo compartment and having an overboard position in which exhaust from the compressed gas used by the turbo pump is directed out of the aircraft, and a cargo position in which the exhaust from the compressed gas used by the turbo pump is directed into the cargo compartment to suppress the fire.

In any of the foregoing embodiments, the OBIGGS is further configured to provide the inert gas to a fuel tank of the aircraft.

Any of the foregoing embodiments may also include an OBIGGS selector valve having a tank position in which the inert gas from the OBIGGS can flow through the OBIGGS selector valve to the fuel tank, a cargo position in which the inert gas from the OBIGGS can flow through the OBIGGS selector valve to the cargo compartment, and a dual position in which the inert gas from the OBIGGS can flow through the OBIGGS selector valve to the fuel tank and to the cargo compartment.

Any of the foregoing embodiments may also include an input device configured to receive user input corresponding to desired operation of the OBIGGS and a controller coupled to the OBIGGS and configured to cause the OBIGGS to perform the desired operation based on the user input.

Also disclosed is an aircraft. The aircraft includes a cargo compartment, and a gas turbine engine. The aircraft also includes a turbo pump configured to convert a compressed gas into at least one of electrical power, hydraulic power, or pneumatic power. The aircraft also includes a storage tank configured to store the compressed gas. The aircraft also includes a fire suppression control valve configured to be coupled between the storage tank and the cargo compartment and having a suppression closed position in which the compressed gas is prevented from flowing to the cargo compartment and a suppression open position in which the compressed gas is ported through the fire suppression control valve to the cargo compartment to suppress a fire. The aircraft also includes a pump control valve configured to be coupled between the turbo pump and the storage tank and having a pump closed position in which the compressed gas is prevented from flowing to the turbo pump and a pump open position in which the compressed gas is ported through the pump control valve to the turbo pump to cause the turbo pump to convert the compressed gas into the at least one of the electrical power, the hydraulic power, or the pneumatic power. The aircraft also includes an On Board Inert Gas Generating System (OBIGGS) configured to receive additional hydraulic, electric, or pneumatic power from the gas turbine engine and to generate an inert gas to provide low rate discharge (LRD) fire suppression to the cargo compartment.

Any of the foregoing embodiments may also include a controller coupled to the fire suppression control valve and the OBIGGS and configured to control the fire suppression control valve to change from the suppression closed position to the suppression open position in response to determining that the fire exists in the cargo compartment to provide an initial fire knockdown, and to control the OBIGGS to generate the inert gas to provide the LRD fire suppression to the cargo compartment.

In any of the foregoing embodiments, the controller is further configured to control the pump control valve to be in the pump open position in response to determining that the aircraft lacks power.

In any of the foregoing embodiments, the fire suppression control valve further has a suppression partially open position in which the compressed gas may flow to the cargo compartment at a slower rate than in the suppression open position, wherein the controller is further configured to control the fire suppression control valve to change from the suppression open position to the suppression partially open position after a predetermined amount of time from controlling the fire suppression control valve from the suppression closed position to the suppression open position to provide additional LRD fire suppression.

Any of the foregoing embodiments may also include a fuel tank configured to store a fuel to be used by the gas turbine engine, wherein the OBIGGS is further configured to provide the inert gas to a fuel tank of the aircraft.

Any of the foregoing embodiments may also include an OBIGGS selector valve having a tank position in which the inert gas from the OBIGGS can flow through the OBIGGS selector valve to the fuel tank, a cargo position in which the inert gas from the OBIGGS can flow through the OBIGGS selector valve to the cargo compartment, and a dual position in which the inert gas from the OBIGGS can flow through the OBIGGS selector valve to the fuel tank and to the cargo compartment.

Any of the foregoing embodiments may also include an input device configured to receive user input corresponding to desired operation of the OBIGGS and a controller coupled to the OBIGGS and configured to cause the OBIGGS to perform the desired operation based on the user input.

Any of the foregoing embodiments may also include a fuel tank, wherein the OBIGGS is further configured to provide the inert gas to the fuel tank.

Also disclosed is a method for providing supplemental power and fire suppression on an aircraft. The method includes identifying, by a controller, whether a fire condition exists or a fire condition does not exist in a cargo compartment of the aircraft. The method also includes controlling, by the controller, a fire suppression control valve in fluidic communication with a storage tank and the cargo compartment such that the fire suppression control valve is maintained in a suppression closed position in response to identifying that the fire condition does not exist in which compressed gas stored in the storage tank is prevented from flowing to the cargo compartment or changing the fire suppression control valve to a suppression open position in which the compressed gas in the storage tank is ported through the fire suppression control valve to the cargo compartment in response to identifying that the fire condition exists. The method also includes controlling, by the controller, an On Board Inert Gas Generating System (OBIGGS) to receive bleed air from a gas turbine engine and to convert the bleed air into an inert gas to provide low rate discharge (LRD) fire suppression to the cargo compartment in response to identifying that the fire condition exists. The method also includes identifying, by the controller, whether a power condition exists in which the aircraft has lost electrical or hydraulic power or whether the power condition does not exist. The method also includes controlling, by the controller, a pump control valve in fluidic communication with the storage tank and with a turbo pump such that the pump control valve is in a pump closed position such that the compressed gas is prevented from flowing to the turbo pump in response to identifying that the power condition does not exist or a turbo pump open position in which the compressed gas is ported through the pump control valve to the turbo pump to cause the turbo pump to convert the compressed gas into at least one of electrical power, hydraulic power, or pneumatic power in response to identifying that the power condition exists.

Any of the foregoing embodiments may also include controlling, by the controller, the fire suppression control valve to change from the suppression open position to a suppression partially open position in which the compressed gas may flow to the cargo compartment at a slower rate than in the suppression open position a predetermined amount of time after changing the fire suppression control valve to the suppression open position to provide additional LRD fire suppression.

Any of the foregoing embodiments may also include controlling, by the controller, a turbine exhaust selector valve in fluidic communication with the turbo pump and the cargo compartment to switch from an overboard position in which exhaust from the compressed gas used by the turbo pump is directed out of the aircraft to a cargo position in which the exhaust from the compressed gas used by the turbo pump is directed into the cargo compartment to suppress the fire in response to identifying that the fire condition exists and that the power condition exists.

Any of the foregoing embodiments may also include receiving, by an input device, user input corresponding to desired operation of the OBIGGS; and controlling, by the controller, the OBIGGS to perform the desired operation.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
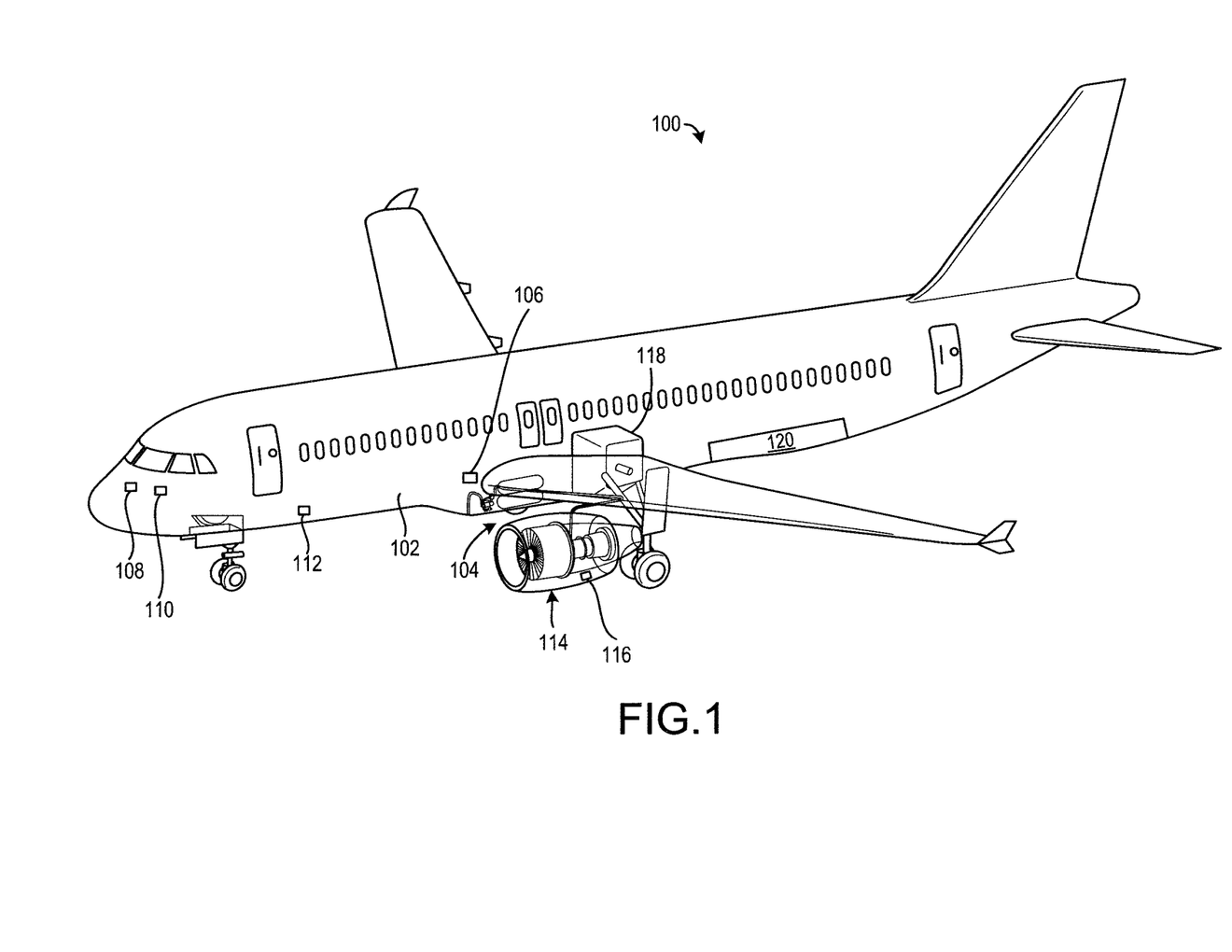
FIG. 1 is a drawing of an aircraft having a system for providing supplemental power and fire suppression, in accordance with various embodiments of the present disclosure.

Referring to FIG. 1, an aircraft 100 includes a cargo compartment 102 in which cargo may be stored. The aircraft 100 may further include a system 104 for providing supplemental power to various components of the aircraft 100 and for providing fire suppression to the cargo compartment 102. The aircraft 100 may further include a gas turbine engine 114.

The gas turbine engine 114 may have a compressor section that compresses gas, a combustor section that combusts a mixture of the compressed gas and fuel, and a turbine section that converts exhaust from the combustor section into rotational power (such as torque).

The system 104 may be used to provide the functionality that is provided by both ram air turbines (RATs) and halon fire suppression systems. The system 104 may include a controller 106, an input device 108, an electrical sensor 110, a fire sensor 112, an engine sensor 116, an On Board Inert Gas Generating System (OBIGGS), and a fuel tank 120.

The controller 106 may include a logic device such as one or more of a central processing unit (CPU), an accelerated processing unit (APU), a digital signal processor (DSP), a field programmable gate array (FPGA), an application specific integrated circuit (ASIC), or the like. In various embodiments, the controller 106 may further include any non-transitory memory known in the art. The memory may store instructions usable by the logic device to perform operations as described herein.

The input device 108 may include any input device capable of receiving user input, such as a keyboard, a joystick, a mouse, a microphone, or the like.

The electrical sensor 110 may include any sensor capable of detecting electrical power, hydraulic power, or pneumatic power. For example, the electrical sensor 110 may include a voltage sensor, a current sensor, a pressure sensor, or the like.

The fire sensor 112 may be located in the cargo compartment 102 and may include any sensor capable of detecting a fire, such as a flame detector (e.g., an infrared flame detector), a smoke detector, or the like.

The engine sensor 116 may be capable of identifying whether the gas turbine engine 114 is operating or is failing to operate. For example, the engine sensor 116 may include a pressure sensor that can detect a pressure in a portion of the gas turbine engine 114.

The OBIGGS 118 may receive electric power, hydraulic power, or pneumatic power from the gas turbine engine 114. For example, bleed air may be received from a compressor section or a turbine section of the gas turbine engine 114. The OBIGGS 118 may convert the bleed air into an inert gas or less reactive gas, such as a gas with a relatively high concentration of nitrogen (such as 95%), using the electric power, hydraulic power, or pneumatic power. The OBIGGS 118 may include air separation units that remove oxygen and deliver a less combustible, nitrogen-enriched relatively inert gas.

The fuel tank 120 may store a fuel usable by the gas turbine engine 114. For example, the gas turbine engine 114 may include a combustor section in which compressed gas and the fuel mix and are combusted to generate exhaust.

The controller 106 may identify a power condition based on data received from the electrical sensor 110. For example, if the electrical sensor 110 detects a lack of power (such as electrical or hydraulic power) in a portion of the aircraft 100, then the controller 106 may identify the power condition. The controller 106 may more specifically identify an engine on power condition in response to the electrical sensor 110 detecting a lack of electrical or hydraulic power and the engine sensor detecting that the gas turbine engine 114 is operating. The controller 106 may further identify an engine off power condition in response to the electrical sensor 110 detecting a lack of electrical or hydraulic power and the engine sensor detecting that the gas turbine engine 114 is failing to operate.

The controller 106 may identify a fire condition in the cargo compartment 102 based on data received from the fire sensor 112. For example, if the fire sensor 112 detects presence of fire in the cargo compartment 102, then the controller 106 may identify the fire condition.

The controller 106 may control various aspects of the system 104 to provide supplemental power or to suppress a fire in response to identifying at least one of the fire condition or the power condition.

Figure 2:
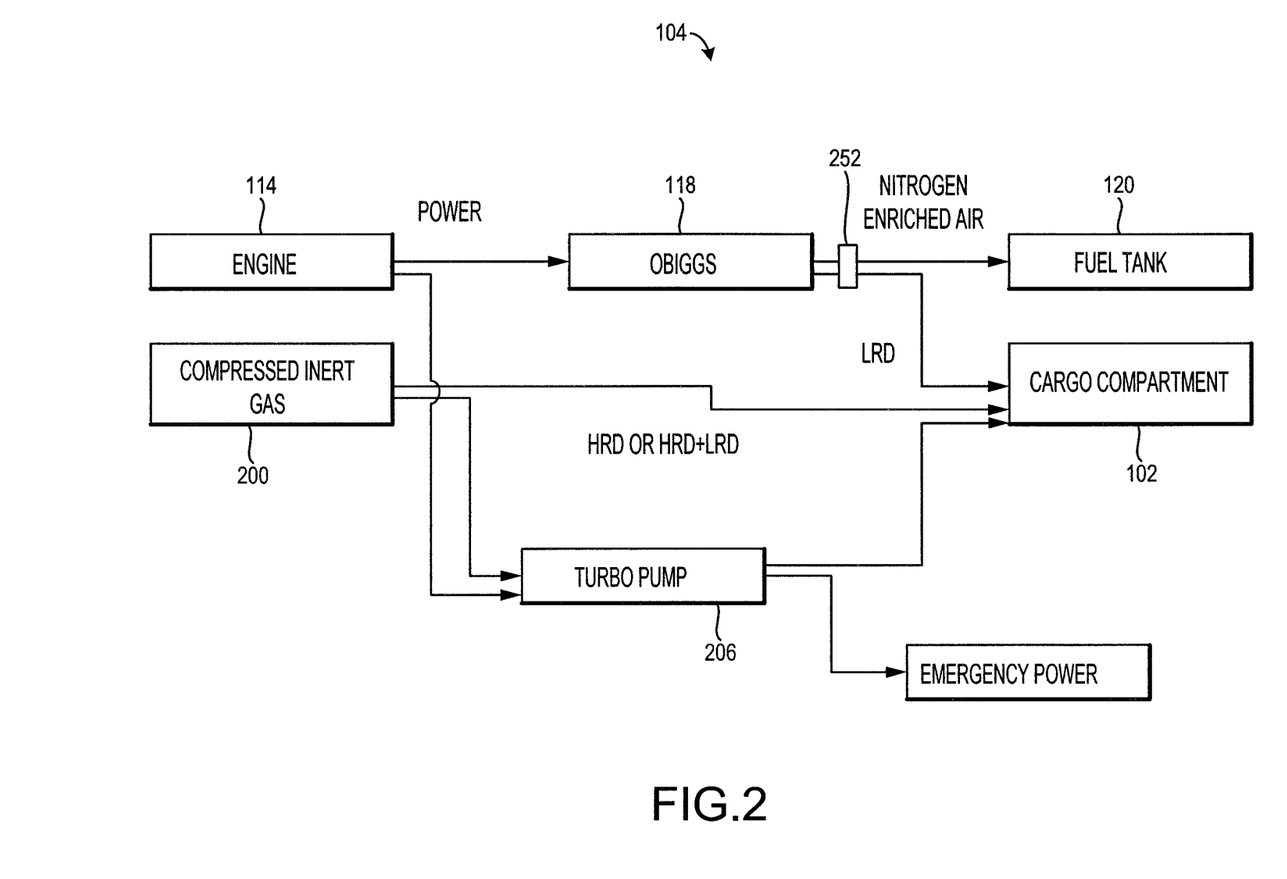
FIG. 2 is a block diagram illustrating various components of the system for providing supplemental power and fire suppression of the aircraft of FIG. 1, in accordance with various embodiments of the present disclosure.
Figure 3:
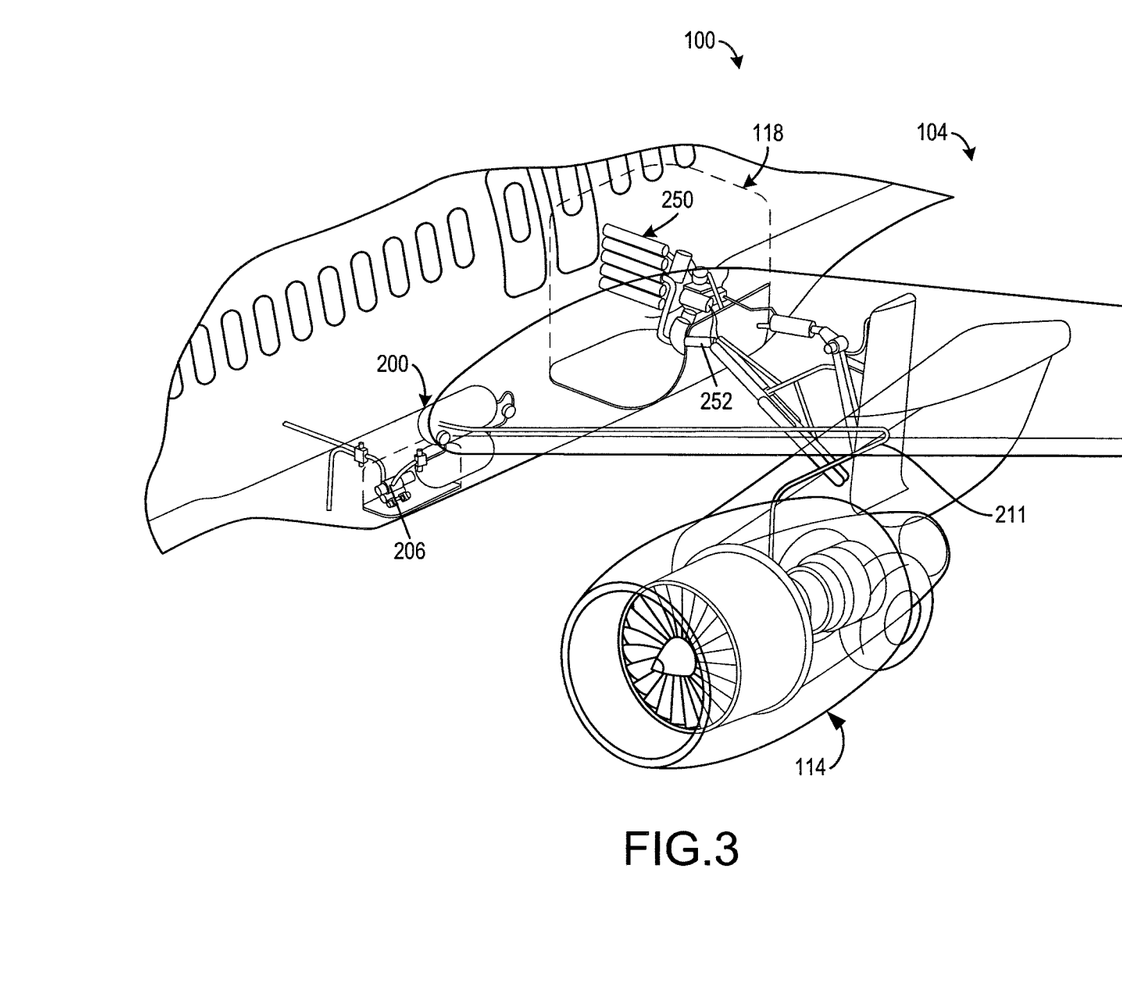
FIG. 3 is a drawing illustrating additional components of the system of FIG. 1, in accordance with various embodiments.
Figure 4:
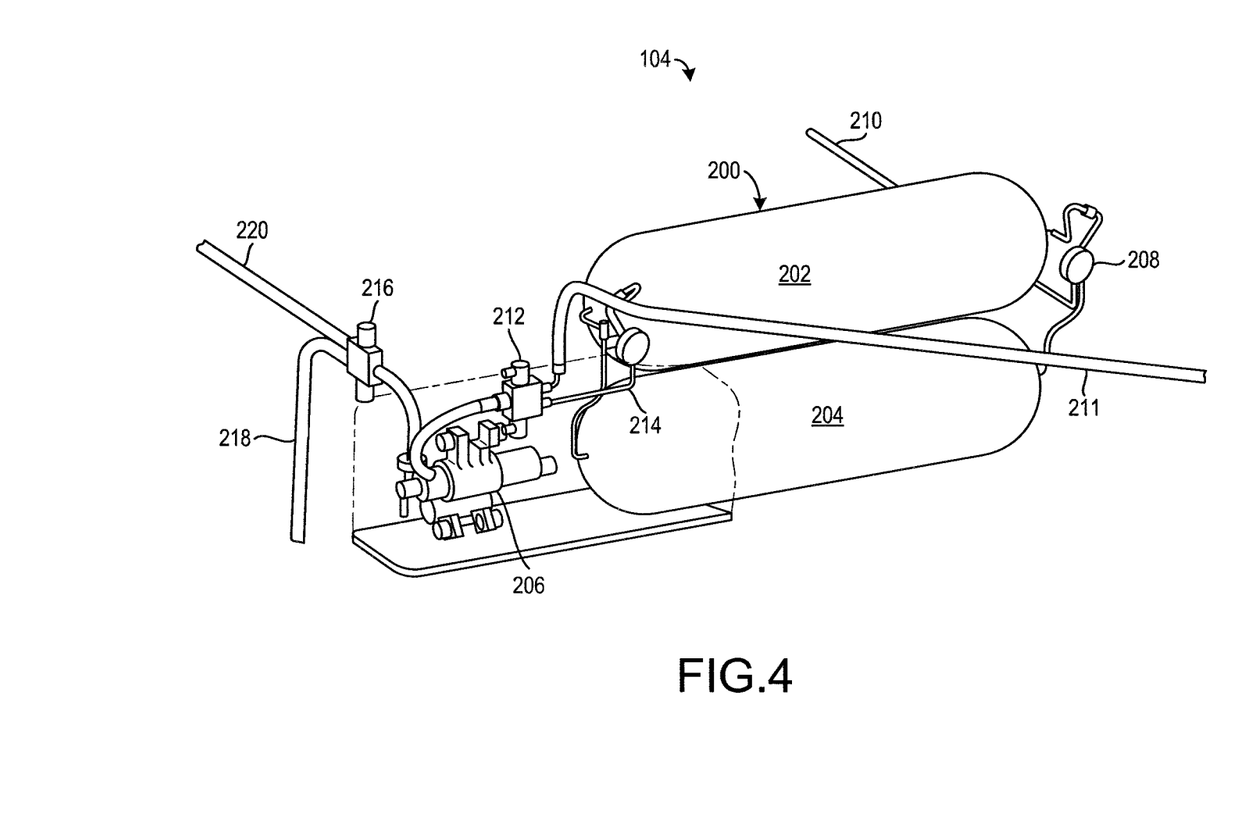
FIG. 4 is a drawing illustrating additional components of the system of FIG. 1, in accordance with various embodiments.

Turning now to FIGS. 2, 3, and 4, additional details of the system 104 and the

OBIGGS are shown. In particular, the system 104 may include one or more storage tank 200 including a first storage tank 202 and a second storage tank 204. The storage tanks 200 may be designed to store a compressed gas, such as helium, nitrogen, hydrogen, or the like. In various embodiments, the storage tanks 200 may be designed to store a compressed inert gas. In various embodiments, the storage tanks 200 together may be capable of storing a 90 pound-mass of helium. The 90 pound-mass of helium may be stored at 10,000 pounds per square inch (68.9 Megapascal) in two storage tanks that are each 16 inches (41 centimeters) in diameter and 44 inches (112 cm) in length, though other storage tank dimensions are contemplated herein.

The system 104 may further include a turbo pump 206. The turbo pump 206 is designed to convert compressed gas (i.e., pneumatic energy) into one or more of electrical power, hydraulic power, or pneumatic power. In that regard, the turbo pump 206 may function as a turbine. In various embodiments, the turbo pump 206 may include a turbine. The electrical power, the hydraulic power, or the pneumatic power may be converted into hydraulic power by the turbo pump 206 or by another piece of equipment, such as a secondary turbine.

The turbo pump 206 may have dimensions that are significantly less than those of a conventional ram air turbine. In that regard, use of the turbo pump 206 may be desirable over use of a ram air turbine.

The system 104 may further include a fire suppression control valve 208. Referring to FIGS. 1, 2, 3, and 4, the fire suppression control valve 208 may be located between the storage tanks 200 and the cargo compartment 102. The fire suppression control valve 208 may have a suppression closed position in which the compressed gas may fail to flow through the fire suppression control valve 208. The fire suppression control valve 208 may further have a suppression open position in which the compressed gas may flow through the fire suppression control valve 208 and through a suppression line 210 to the cargo compartment 102.

The fire suppression control valve 208 may further have a suppression partially open position. The compressed gas may flow through the fire suppression control valve 208 to the cargo compartment 102 at a slower rate in response to the fire suppression control valve 208 being in the suppression partially open position than in response to the fire suppression control valve 208 being in the suppression open position.

The system 104 may further include the OBIGGS 118. The OBIGGS 118 may include multiple air separation units 250 that remove oxygen from the bleed air received from the gas turbine engine 114. The air separation units 250 may output an inert gas, such as nitrogen-enriched air. The inert gas may be provided to one or both of the fuel tank 120 or the cargo compartment 102 from the OBIGGS 118. The OBIGGS 118 may provide a low rate discharge (LRD) fire suppression to the cargo compartment 102.

In response to identifying a fire condition, the controller 106 may control the fire suppression control valve 208 to be in the suppression open position to allow a relatively large volume of gas to flow into the cargo compartment 102 from the storage tanks 200 to suppress the fire. This transfer of gas from the storage tanks 200 to the cargo compartment 102 may be referred to as an initial fire knockdown. For example, 1,300 cubic feet (36.8 cubic meters) of atmospheric pressure of the gas may be initially provided to the cargo compartment 102 during the initial fire knockdown. This may correspond to a 50 percent (50%) purge ratio.

After expiration of a predetermined period of time, the controller 106 may control the fire suppression control valve 208 to be in the suppression partially open position to continue providing the inert gas to the cargo compartment 102 at a slower rate. This may be referred to as a LRD fire suppression phase. In various embodiments, assuming an aircraft leakage rate of 1000 cubic feet (28.3 cubic meters) per hour, the storage tanks 200 may include a sufficient quantity of compressed gas to provide the initial fire knockdown along with approximately 8 hours of LRD fire suppression. Where used in this context, the term "approximately" refers to the stated value plus or minus 10% of the stated value.

The controller 106 may further control the OBIGGS 118 to provide the inert gas to one or both of the fuel tank 120 or the cargo compartment 102 in response to identifying the fire condition. In various embodiments, the controller 106 may control the OBIGGS 118 to provide the inert gas to the fuel tank 120 until the fuel tank 120 is pressurized with the inert gas to a desired pressure, and then may control the OBIGGS 118 to provide the inert gas to the cargo compartment 102. In various embodiments, the controller 106 may control the OBIGGS 118 to provide the inert gas to the fuel tank 120 and the cargo compartment 102 simultaneously. In various embodiments, the controller 106 may control the OBIGGS 118 to provide the inert gas to the fuel tank 120 until the initial fire knockdown is complete, and may then control the OBIGGS 118 to provide the inert gas to the cargo compartment 102.

In various embodiments, the system 104 may further include an OBIGGS selector valve 252. The OBIGGS selector valve 252 may have a tank position in which the inert gas from the OBIGGS 118 can flow through the OBIGGS selector valve 252 to the fuel tank 120. The OBIGGS selector valve 252 may further have a cargo position in which the inert gas from the OBIGGS 118 can flow through the OBIGGS selector valve 252 to the cargo compartment 102. The OBIGGS selector valve 252 may further include a dual position in which the inert gas from the OBIGGS 118 can flow through the OBIGGS selector valve 252 to both the fuel tank 120 and the cargo compartment 102.

The system 104 may further include a propellant selector valve 212. The propellant selector valve 212 may be coupled between the storage tanks 200 and the turbo pump 206, and the gas turbine engine 114 and the turbo pump 206. The propellant selector valve 212 may have a selector off position in which compressed gas is prevented from flowing to the turbo pump 206 from either of the storage tanks 200 or the gas turbine engine 114. The propellant selector valve 212 may further have a tank position in which tank compressed gas is ported from the storage tanks 200 to the turbo pump 206 via a tank line 214. The propellant selector valve 212 may further have an engine position in which engine compressed gas from the gas turbine engine 114 is ported from the gas turbine engine 114 to the turbo pump 206 via a bleed line 211. The engine compressed gas may be bleed air received from at least one of a compressor section or a turbine section of the gas turbine engine 114.

The controller 106 may control the propellant selector valve 212 based on the power condition. In particular, if the electrical sensor 110 indicates that the aircraft 100 is lacking power (such as at least one of electrical power or hydraulic power), then the controller 106 may identify a power condition. In response to identifying the power condition, the controller 106 may determine whether the power condition is an engine off power condition or an engine on power condition based on data detected by the engine sensor 116. If the gas turbine engine 114 is operating and the aircraft 100 is lacking power then the controller 106 may identify an engine on power condition. If the gas turbine engine 114 is failing to operate and the aircraft 100 is lacking the power then the controller 106 may identify an engine off power condition.

In response to identifying the engine on power condition, the controller 106 may control the propellant selector valve 212 to be in the engine position to allow the engine compressed gas flow through the propellant selector valve 212 via the bleed line 211. In response to identifying the engine off power condition, the controller 106 may control the propellant selector valve 212 to be in the tank positioned to allow the tank compressed gas to flow through the propellant selector valve 212 via the tank line 214. Allowing the engine compressed gas to flow as the propellant to the turbo pump 206 may be advantageous as the compressed gas may be provided by the gas turbine engine 114 for an infinite period of time, whereas the storage tanks 200 only include a limited supply of tank compressed gas.

Some aircraft may include multiple gas turbine engines. In various embodiments, the bleed line 211 may receive engine compressed gas from multiple gas turbine engines. In that regard, the controller 106 may identify the engine on power condition if any gas turbine engine that provides gas to the bleed line 211 is operating.

In various embodiments, the propellant selector valve 212 may include a first engine position and a second engine position, and be configured to receive first engine compressed gas from a first gas turbine engine in response to being in the first engine position, and to receive second engine compressed gas from a second gas turbine engine in response to being in the second engine position. In various embodiments, each engine may include an engine sensor and the controller may select the first engine position or the second engine position based on the data detected by each engine sensor. For example, if the first engine is not operating and the second engine is operating then the controller 106 may control the propellant selector valve to be in the second engine position.

In response to receiving the compressed gas, the turbo pump 206 may generate one or more of electricity, hydraulic power, or pneumatic power. In various embodiments, the turbo pump 206 may be controlled by the controller 106 to generate one or more of the electricity, the hydraulic power, or the pneumatic power based on data detected by the electrical sensor 110.

The storage tanks 200 may store a sufficient amount of compressed gas for the turbo pump 206 to provide an average of 20 Kilowatts of power for at least half of an hour. This may be a sufficient amount of power to safely land the aircraft 100 in response to failure of all engines of the aircraft 100.

The system 104 may further include a turbine exhaust selector valve 216. The turbine exhaust selector valve 216 may receive exhaust from the turbo pump 206 that corresponds to the compressed gas used by the turbo pump 206. The turbine exhaust selector valve 216 may have an overboard position in which the exhaust is directed out of the aircraft 100 via an overboard line 218. The turbine exhaust selector valve 216 may further have a cargo position in which the exhaust is directed into the cargo compartment 102 via a cargo line 220. The controller 106 may control the turbine exhaust selector valve 216 to be in the overboard position in response to identifying the power condition and identifying a lack of a fire condition, and may control the turbine exhaust selector valve 216 to be in the cargo position in response to identifying the fire condition and either of the engine on power condition or the engine off power condition.

It may be undesirable for the turbine exhaust selector valve 216 to be in the cargo position while the propellant selector valve 212 is in the engine position as the compressed gas from the gas turbine engine 114 may include oxygen and may thus provide fuel for any fire in the cargo compartment 102.

In various embodiments, in response to identifying either power condition and the fire condition, the controller 106 may control the fire suppression control valve 208 to be in the suppression open position to provide the fire knockdown and may simultaneously control the propellant selector valve 212 to be in the tank position to allow the tank compressed gas to power the turbo pump 206. The controller 106 may further control the turbine exhaust selector valve 216 to be in the cargo position to allow the inert exhaust to flow to the cargo compartment 102. After the fire knockdown phase, the controller 106 may control the fire suppression control valve 208 to be in the suppression off position, such that the LRD fire suppression is provided to the cargo compartment 102 via the cargo line 220 to reduce waste of the compressed gas.

In various embodiments, one or more of the fire suppression control valve 208, the propellant selector valve 212, or the turbine exhaust selector valve 216 may be operated or controlled manually in addition to, or instead of, being controlled by the controller 106. In various embodiments, the input device 108 may receive a desired position of one or more of the fire suppression control valve 208, the propellant selector valve 212, or the turbine exhaust selector valve 216, and the controller 106 may control the one or more of the fire suppression control valve 208, the propellant selector valve 212, or the turbine exhaust selector valve 216 to be in the desired position based on the user input.

Figure 5:
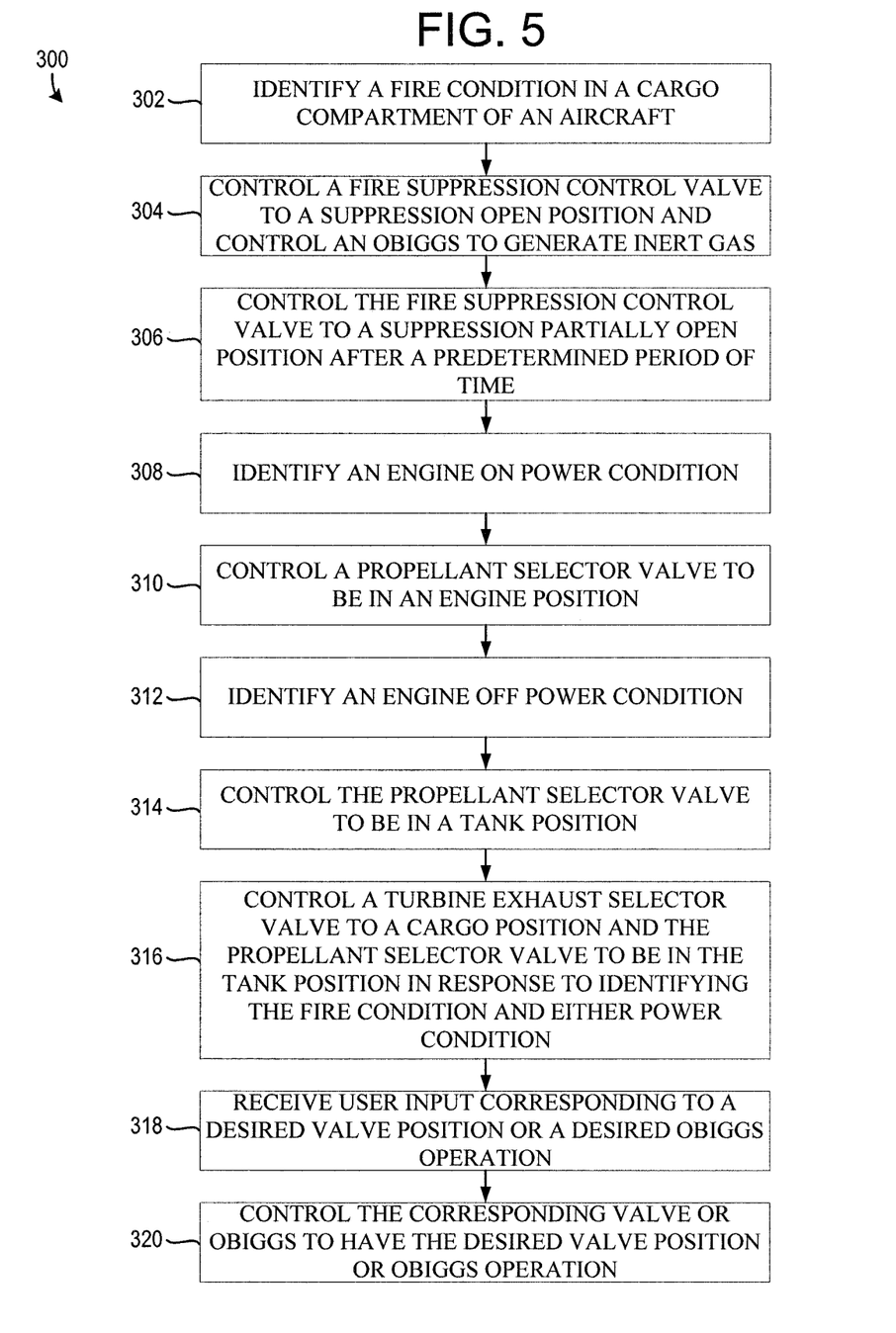
FIG. 5 is a flowchart illustrating a method for providing supplemental power and fire suppression to an aircraft, in accordance with various embodiments of the present disclosure.

Referring now to FIG. 5, a method 300 for providing supplemental power and fire suppression to an aircraft is shown. The method 300 may be performed by a system similar to the system 104 of FIGS. 1, 2, 3, and 4. For example, the method 300 may be performed by a controller similar to the controller 106 of FIG. 1.

In block 302, the controller may receive fire data from a fire sensor and may identify a fire condition in a cargo compartment of an aircraft based on the fire data. For example, if the fire data indicates that the fire is present in the cargo compartment, then the controller may identify the fire condition.

In block 304, the controller may control a fire suppression control valve to change from a suppression closed position in which compressed gas is prevented from flowing from a storage tank to the cargo compartment to a suppression open position to allow the compressed (inert) gas to flow from the storage tank to the cargo compartment to provide an initial fire knockdown. The controller may control the fire suppression control valve to change to the suppression open position in response to identifying the fire condition.

The controller may further control an OBIGGS to generate inert gas. In various embodiments, the controller may further control an OBIGGS selector valve to be in a tank position in response to identifying the fire condition. In various embodiments, the controller may control the OBIGGS selector valve to be in a dual position in response to identifying the fire condition. In various embodiments, the controller may control the OBIGGS selector valve to be in a cargo position after identifying that a predetermined amount of inert gas has been provided to the fuel tank. In various embodiments, the controller may control the OBIGGS selector valve to be in the cargo position after the initial fire knockdown has been provided via the fire suppression control valve.

In block 306, the controller may control the fire suppression control valve to change from the suppression open position to a suppression partially open position after a predetermined period of time corresponding to the fire knockdown phase has expired. The fire suppression control valve may provide LRD fire suppression in response to being in the suppression partially open position.

In block 308, the controller may receive detected power data from an electrical sensor of the aircraft, and may receive detected engine data from one or more engine sensor of the aircraft. The controller may identify an engine on power condition based on the detected data. For example, the controller may identify the engine on power condition in response to the power data indicating that the aircraft has lost power and the engine data indicating that at least one gas turbine engine of the aircraft is operating and capable of providing engine compressed gas to a propellant selector valve.

In block 310, the controller may control the propellant selector valve to be in an engine position to allow the engine compressed gas from the gas turbine engine to flow to the turbo pump. In that regard, the compressed gas may be used by the turbo pump to generate at least one of the electrical power or the pneumatic power to supplement the power that was lost in the engine on power condition.

In block 312, the controller may receive detected power data from an electrical sensor of the aircraft, and may receive detected engine data from one or more engine sensor of the aircraft. The controller may identify an engine off power condition based on the detected data. For example, the controller may identify the engine off power condition in response to the power data indicating that the aircraft has lost at least one of electrical power or hydraulic power and the engine data indicating that at least one gas turbine engine of the aircraft is failing to operate and the propellant selector valve is incapable of receiving engine compressed gas.

In block 314, the controller may control the propellant selector valve to be in a tank position to allow the tank compressed gas from the storage tank to flow to the turbo pump in response to identifying the engine off power condition. In that regard, the tank compressed gas may be used by the turbo pump to generate at least one of the electrical power or the pneumatic power to supplement the power that was lost in the power condition.

In various embodiments, the controller may identify whether electrical or hydraulic power was lost, and may control the turbo pump to provide the type of power that was lost. In various embodiments, the controller may control the turbo pump to provide both electrical and pneumatic power.

In block 316, in response to identifying both the fire condition and either of the engine on power condition or the engine off power condition, the controller may control a turbine exhaust selector valve to be in a cargo position to allow exhaust from the turbo pump flow into the cargo compartment and may control the propellant selector valve to be in the tank position. In that regard, the exhaust from the turbo pump may include an inert gas (provided by the storage tank) and thus may provide LRD fire suppression to the cargo compartment.

In block 318, the controller may receive user input from an input device that corresponds to a desired valve position of one or more of the fire suppression control valve, the propellant selector valve, or the turbine exhaust selector valve. In various embodiments, the user input may correspond to desired operation of the OBIGGS, or a desired valve position of the OBIGGS selector valve.

In block 320, the controller may control the corresponding one or more of the fire suppression control valve, the propellant selector valve, the turbine exhaust selector valve, or the OBIGGS selector valve to have the desired valve position, or may control the desired operation of the OBIGGS based on the user input. In various embodiments, the user input may override any decision made by the controller regarding valve position or OBIGGS operation. For example, if the controller identifies a lack of a fire condition, a user may still control the fire suppression control valve to be in a suppression open position by selecting the suppression open position as the desired position using the input device.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for providing supplemental power and fire suppression on an aircraft having a gas turbine engine, comprising:
   a turbine configured to directly convert a compressed gas into at least one of electrical power, hydraulic power, or pneumatic power;

a storage tank located upstream from the turbine and configured to store the compressed gas;

a fire suppression control valve configured to be coupled between the storage tank and a cargo compartment of the aircraft and having a suppression closed position in which the compressed gas is prevented from flowing to the cargo compartment and a suppression open position in which the compressed gas is ported through the fire suppression control valve to the cargo compartment to suppress a fire;

a pump control valve configured to be coupled between the turbine and the storage tank and having a pump closed position in which the compressed gas is prevented from flowing to the turbine and a pump open position in which the compressed gas is ported through the pump control valve to the turbine to cause the turbine to convert the compressed gas into the at least one of the electrical power, the hydraulic power, or the pneumatic power;

an On Board Inert Gas Generating System (OBIGGS) configured to receive additional pneumatic, hydraulic, or electric power from the gas turbine engine and to generate an inert gas to provide a suppression of the fire to the cargo compartment;

and a turbine exhaust selector valve located between the turbine and the cargo compartment and having an overboard position in which an exhaust from the compressed gas used by the turbine is directed out of the aircraft, and a cargo position in which the exhaust from the compressed gas used by the turbine is directed into the cargo compartment to suppress the fire.

2. The system of claim 1, further comprising a controller coupled to the fire suppression control valve and the OBIGGS and configured to control the fire suppression control valve to change from the suppression closed position to the suppression open position in response to the controller determining that the fire exists in the cargo compartment to provide an initial knockdown of the fire, and to control the OBIGGS to generate the inert gas to provide the suppression of the fire to the cargo compartment.

3. The system of claim 2, wherein the controller is further configured to control the pump control valve to be in the pump open position in response to the controller determining that the aircraft lacks power.

4. The system of claim 2, wherein the fire suppression control valve further has a suppression partially open position in which the compressed gas may flow to the cargo compartment at a slower rate than in the suppression open position, wherein the controller is further configured to control the fire suppression control valve to change from the suppression open position to the suppression partially open position after a predetermined amount of time from controlling the fire suppression control valve from the suppression closed position to the suppression open position to provide an additional suppression of the fire.

5. The system of claim 1, wherein the OBIGGS is further configured to provide the inert gas to a fuel tank of the aircraft.

6. The system of claim 5, further comprising an OBIGGS selector valve having a tank position in which the inert gas from the OBIGGS can flow through the OBIGGS selector valve to the fuel tank, a cargo position in which the inert gas from the OBIGGS can flow through the OBIGGS selector valve to the cargo compartment, and a dual position in which the inert gas from the OBIGGS can flow through the OBIGGS selector valve to the fuel tank and to the cargo compartment.

7. The system of claim 1, further comprising an input device configured to receive a user input corresponding to a desired operation of the OBIGGS and a controller coupled to the OBIGGS and configured to cause the OBIGGS to perform the desired operation based on the user input.

8. An aircraft, comprising:
a cargo compartment;
a gas turbine engine;
a turbine configured to convert a compressed gas into at least one of electrical power, hydraulic power, or pneumatic power;
a storage tank located upstream from the turbine and configured to store the compressed gas;
a fire suppression control valve configured to be coupled between the storage tank and the cargo compartment and having a suppression closed position in which the compressed gas is prevented from flowing to the cargo compartment and a suppression open position in which the compressed gas is ported through the fire suppression control valve to the cargo compartment to suppress a fire;
a pump control valve configured to be coupled between the turbine and the storage tank and having a pump closed position in which the compressed gas is prevented from flowing to the turbine and a pump open position in which the compressed gas is ported through the pump control valve to the turbine to cause the turbine to convert the compressed gas into the at least one of the electrical power, the hydraulic power, or the pneumatic power;
an On Board Inert Gas Generating System (OBIGGS) configured to receive additional hydraulic, electric, or pneumatic power from the gas turbine engine and to generate an inert gas to provide a suppression of the fire to the cargo compartment;
a turbine exhaust selector valve located between the turbine and the cargo compartment and having an overboard position in which an exhaust from the compressed gas used by the turbine is directed out of the aircraft, and a cargo position in which the exhaust from the compressed gas used by the turbine is directed into the cargo compartment to suppress the fire; and a fuel tank configured to store a fuel to be used by the gas turbine engine, wherein the OBIGGS is further configured to provide the inert gas to the fuel tank of the aircraft.

9. The aircraft of claim 8, further comprising a controller coupled to the fire suppression control valve and the OBIGGS and configured to control the fire suppression control valve to change from the suppression closed position to the suppression open position in response to the controller determining that the fire exists in the cargo compartment to provide an initial knockdown of the fire, and to control the OBIGGS to generate the inert gas to provide the suppression of the fire to the cargo compartment.

10. The aircraft of claim 9, wherein the fire suppression control valve further has a suppression partially open position in which the compressed gas may flow to the cargo compartment at a slower rate than in the suppression open position, wherein the controller is further configured to control the fire suppression control valve to change from the suppression open position to the suppression partially open position after a predetermined amount of time from controlling the fire suppression control valve from the suppression closed position to the suppression open position to provide an additional suppression of the fire.

11. The aircraft of claim 8, further comprising an OBIGGS selector valve having a tank position in which the inert gas from the OBIGGS can flow through the OBIGGS selector valve to the fuel tank, a cargo position in which the inert gas from the OBIGGS can flow through the OBIGGS selector valve to the cargo compartment, and a dual position in which the inert gas from the OBIGGS can flow through the OBIGGS selector valve to the fuel tank and to the cargo compartment.

12. A method for providing supplemental power and fire suppression on an aircraft, comprising:
identifying, by a controller, whether a fire condition exists or the fire condition does not exist in a cargo compartment of the aircraft;
controlling, by the controller, a fire suppression control valve in fluidic communication with a storage tank and the cargo compartment, such that the fire suppression control valve is maintained in a suppression closed position in response to the controller identifying that the fire condition does not exist, in which a compressed gas stored in the storage tank is prevented from flowing to the cargo compartment, or changing the fire suppression control valve to a suppression open position in which the compressed gas in the storage tank is ported through the fire suppression control valve to the cargo compartment in response to the controller identifying that the fire condition exists;
controlling, by the controller, an On Board Inert Gas Generating System (OBIGGS) to receive bleed air from a gas turbine engine and to convert the bleed air into an inert gas to provide a suppression of the fire condition to the cargo compartment in response to identifying that the fire condition exists;
identifying, by the controller, whether a power condition exists in which the aircraft has lost electrical or hydraulic power or whether the power condition does not exist;
controlling, by the controller, a pump control valve in fluidic communication with the storage tank and with a turbine that is located downstream from the storage tank such that the pump control valve is in a pump closed position such that the compressed gas is prevented from flowing to the turbine in response to the controller identifying that the power condition does not exist or a turbine open position in which the compressed gas is ported through the pump control valve to the turbine to cause the turbine to convert the compressed gas directly into at least one of electrical power, hydraulic power, or pneumatic power in response to the controller identifying that the power condition exists;
and controlling, by the controller, a turbine exhaust selector valve in fluidic communication with the turbine and the cargo compartment to switch from an overboard position in which an exhaust from the compressed gas used by the turbine is directed out of the aircraft to a cargo position in which the exhaust from the compressed gas used by the turbine is directed into the cargo compartment to suppress the fire condition in response to identifying that the fire condition exists and that the power condition exists.

13. The method of claim 12, further comprising controlling, by the controller, the fire suppression control valve to change from the suppression open position to a suppression partially open position in which the compressed gas may flow to the cargo compartment at a slower rate than in the suppression open position a predetermined amount of time after changing the fire suppression control valve to the suppression open position to provide an additional suppression of the fire condition.

14. The method of claim 12, further comprising: receiving, by an input device, a user input corresponding to a desired operation of the OBIGGS; and controlling, by the controller, the OBIGGS to perform the desired operation.

* * * * *